United States Patent [19]
Andrews

[11] 3,894,173
[45] July 8, 1975

[54] METHOD OF APPLYING TELEPHONE PAIR IDENTIFICATION SLEEVE, SLEEVE, AND REELED CABLE COMPRISING SAME

[75] Inventor: Franklin D. Andrews, Eden, N.C.

[73] Assignee: The Anaconda Company, New York, N.Y.

[22] Filed: July 24, 1974

[21] Appl. No.: 491,579

[52] U.S. Cl. .................. 174/74 R; 29/624; 40/316; 138/118; 138/177; 174/10; 174/112
[51] Int. Cl. ...... H01b 7/36; H02g 15/04; G09f 3/00
[58] Field of Search ........ 174/10, 71 R, 72 A, 74 R, 174/74 A, 83, 112, 135, 138 F, 167; 29/593, 624; 40/19, 316; 138/104, 118, 177, DIG. 11; 324/66; 339/213 R, 213 S, 213 T

[56] References Cited
UNITED STATES PATENTS

| | | | |
|---|---|---|---|
| 1,574,297 | 2/1926 | Lilleberg | 174/74 R X |
| 1,841,476 | 1/1932 | Griffin | 40/316 |
| 1,857,197 | 5/1932 | Knoderer | 174/83 X |
| 1,979,756 | 11/1934 | McNamee et al. | 174/135 X |
| 2,166,420 | 7/1939 | Robertson | 174/72 A |
| 2,460,830 | 2/1949 | Knam | 174/72 A UX |
| 3,068,600 | 12/1962 | Blanchet | 40/316 |
| 3,534,777 | 10/1970 | Loof | 174/112 X |
| 3,787,608 | 1/1974 | Colby et al. | 174/159 |

FOREIGN PATENTS OR APPLICATIONS

| | | | |
|---|---|---|---|
| 708,320 | 5/1954 | United Kingdom | 174/77 R |

*Primary Examiner*—Laramie E. Askin
*Attorney, Agent, or Firm*—Pennie & Edmonds

[57] ABSTRACT

Defective pairs in telephone cables are identified by means of long notched plastic sleeves. A pair is inserted into the end of a sleeve and brought out radially through the notch. Manually pushing the long end of the flexible sleeve forces the portion that surrounds the pair of follow the pair helix deep enough into the cable to be visible when the capped end of the cable has been cut off for installation.

14 Claims, 6 Drawing Figures

PATENTED JUL 8 1975  3,894,173

METHOD OF APPLYING TELEPHONE PAIR IDENTIFICATION SLEEVE, SLEEVE, AND REELED CABLE COMPRISING SAME

BACKGROUND OF THE INVENTION

In the manufacture of communication cables such as paper-insulated telephone cables, to which, however I do not wish my invention to be limited, the conductor pairs must be tested after the cable has been completed and reeled. If one or more of the pairs in the cable is found to be defective, the cable may still be shipped, provided the number of the defective pairs does not exceed established standards and provided that the defective pairs are properly identified at both ends of the cable. In the conventional method of identifying a defective pair a short plastic sleeve has been inserted over both ends of the pair and pushed with a tool into the mass of other pairs at the end of the cable. The type of cable to which the present invention has greatest applicability is known as stalpeth cable which has a large number of paper-wrapped conductor pairs enclosed in a solderseamed corrugated steel sheath and covered with a polyethylene jacket. When such a cable has been reeled for shipment, seals in the form of steel closed-end cylinders called "cans" are crimped over the cable jacket. The cans are about five inches long and it was expected that if the sleeves were inserted a greater distance than this, they would be present for indentification in the cable when the cable ends, including the seals, were sawed off preparatory to installation. In practice, however, the sleeves have often been missing because they were not inserted deeply enough and were cut off with the can or were overlooked and lost when the pairs were splayed out for splicing. In making a cable the pairs were helically wound into groups and these groups were helically stranded to form the cable core. Any sleeve applied to a pair is required to follow the helical twisting of the pair and the difficulty of pushing a sleeve around this helix with any known tool is believed to account largely for the unsatisfactory experience with present methods of defective-pair identification.

SUMMARY

I have invented the method of sealing sheathed telephone cables that have helically cabled conductor pairs and at least one defective pair comprising the steps of removing a portion of the sheath from an end of the cable, providing, for the cable, a tubular sealing cover that is closed at one end and, for identifying the defective pair, a flexible sleeve with a notch through its wall at a selected distance along its length. I insert an end of the defective pair into an end of the sleeving and withdraw it radially through the notch leaving the remaining portion of the sleeving free from the pair. While holding one end of the pair taut I then, by gripping the free portion of the sleeving, urge the portion surrounding the pair into the sheathed portion of the cable, following along the helix of the pair, to a depth that exceeds the length of the cover. Finally I cut the pairs and the sleeving flush with a cut end of the sheath, fit the cover over the sheath, and fasten it, as by crimping, thereby sealing the end of the cable. Preferably the notch is cut at a distance of one-half inch to six inches from that end of the sleeve into which the pair is inserted.

I have invented a plastic sleeve for the practice of my method, hereinabove recited, comprising a tubular wall of a polymeric material such, preferably, as polypropylene, nylon, high-density polyethylene, and rigid polyvinyl chloride, that defines a close fitting passageway for a telephone conductor pair. The sleeve is tapered at one end and has a notch preferably from one-half inch to six inches from that end defining an opening for the pair. The notch slopes radially outwardly away from the tapered end of the sleeve which is sufficiently stiff for insertion into the cable by means of a force applied to a portion remote from the notch and sufficiently flexible to follow the helix of the pair.

A coil of sheathed telephone cable of my invention comprises a large plurality of insulated conductor pairs, at least one of which is selected for marking, tubular seals covering both ends of the cable and extending over the sheath for a substantial distance at each end, and polymeric sleeves comprising notches within the cable at both ends thereof. The sleeves comprise portions which cover the selected pair forward of the notches and portions free from the pair rearward of the notches and extend to the ends of the cable and include forward portions that extend beyond the distances covered by the seals.

DETAILED DESCRIPTION OF PREFERRED EMBODIMENTS

Figure 1:
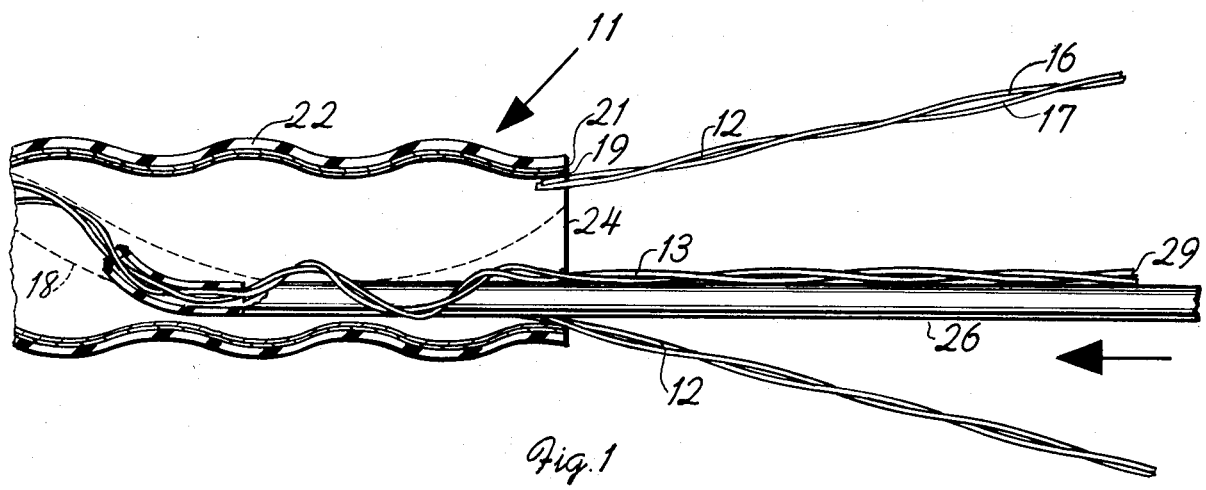
FIG. 1 shows a section through a telephone cable utilizing my invention and illustrates initial steps in the method of my invention.
Figure 2:
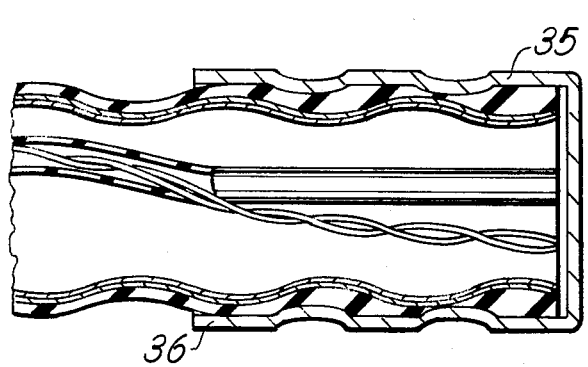
FIG. 2 shows a section through a sealed end of the telephone cable of FIG. 6 and illustrates the final steps in the method of my invention.
Figure 3:
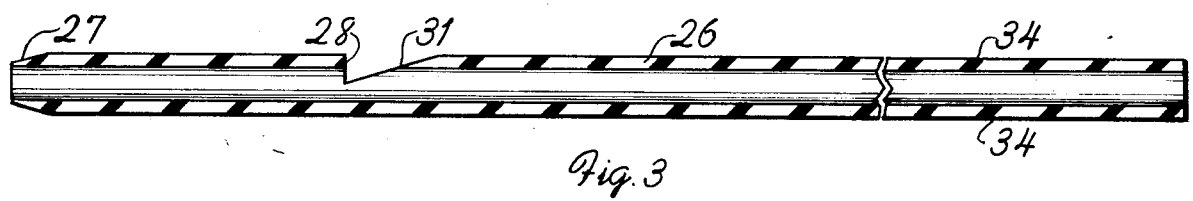
FIG. 3 shows a section through the sleeve of my invention.

An end of a telephone cable is indicated in FIG. 1 by the numeral 11. This cable is of the stalpeth type with a large plurality of conductor pairs 12—12 of which one conductor pair 13 has been found defective. Defects may comprise open pairs, a cross between pairs, shorted pairs, one conductor of a pair missing, wrong gage pairs, high copper resistance or unbalance, and high capacitance unbalance. Although the last three defects are usually distinguished in commercial practice as "deviations" and marked by a different color identification, as shall be explained, I refer herein to all faulty pairs requiring identification as defective pairs. The pairs 12 comprise individual paper-insulated conductors 16, 17 that have been twisted together. The paper of a stalpeth cable may be helically or longitudinally wrapped around the conductors. Cables with longitudinally wrapped conductors are described in U.S. Pat. No. 3,271,508. The pair 13 and, of course the remaining pairs 12, have been helically stranded together into groups such as the group 18 of 25 or 50 pairs, depending on cable size, and the groups then helically cabled to form a core, with the result that the path of any individual pair within the cable is deliberately circuitous. The cable core is surrounded by a corrugated aluminum shield 19 which, in turn, is surrounded by a corrugated steel sheath 21 having an overlapped soldered seam. The entire cable is encased in a polyethylene jacket 22. After the cable 11 has been manufactured and reeled onto a reel 23 (FIG. 6) for shipment, a final testing of the conductors is required and for this purpose the elements 19, 21, 22 are stripped away at an end 24 leaving extensions of the pairs that can then be splayed out and electrically contacted individually. The cable 11 and the operations as so far described are conventional. I now describe novel means and method for identifying the defective pair 13 that was detected by the electrical inspection. A polypropylene sleeve 26 (see also FIG. 3), conveniently about fourteen inches long, is provided for marking the pair 13. A forward end 27 of the sleeve is tapered and a notch 28 opening into the sleeve has been cut through the wall of the sleeve at a distance of 1-½ inches from the end 27. This distance is recommended, but is not critical as shall be explained. A sleeve having a bore of 0.078 inch and outside diameter of 0.139 inch fits Nos. 26–22 Awg conductors and has the desired balance of stiffness and flexibility. I prefer a practice of using orange colored sleeves to mark unusable defective pairs and blue sleeves to mark "deviated" pairs with minor variations from standard. Any number of colors of the sleeves may, of course, be used for detailing information as to the nature of the defects.

Figure 4:
FIGS. 4 and 5 show sections through notched portions of different embodiments of the sleeve of my invention.
Figure 5:

An end 29 of the pair 13 is inserted into the opening of the sleeve 26 at the tapered end 27 and brought out at the notch 28. For this purpose the notch slopes outwardly at 31 away from the end 27 to facilitate pulling through of the pair without damaging the fragile paper insulation. An alternative notch 32 which slopes in two directions is shown in FIG. 4 and a notch 33 in which the slopes are curved is shown in FIG. 5. When sufficient of the pair 13 has been pushed through the notch 28 to grasp the end 29, the pair is held taut with the sleeve 26 still being outside of the cable. The sleeve is then hand gripped on an area 34 remote from the notch and urged into the cut end of the cable with the portion between the taper 27 and notch 28 surrounding and following the helix of the pair, and the portion between the notch 28 and area 34 remaining straight and free from the pair 13. I have found that the described sleeve 26 can be readily pushed a distance of 9 to 12 inches or further into the cable 11 without damaging the insulation on the pair 13 or adjacent pairs. After the sleeve 26, and any additional sleeves that are required for additional defective pairs, has been inserted to the desired depth, which I prefer to be about nine inches, all the pairs 12 and the protruding portion of the sleeve 26 are guillotined flush with the end 24. A sealing cover in the form of a steel can 35 is then applied over the jacket 22 and sealed by means of a suitable conventional sinking tool. The tubular portion 36 of the can 35 has a length of about five inches with the result that the sleeve extends safely beyond the can into the cable.

At the installation site the can will be removed by cutting the cable and a portion of the sheath and jacket wall will be cut away to expose the conductors. When this is done, the free portion of the sleeve 26, still attached to a forward portion surrounding the pair 13 will immediately identify that pair.

Figure 6:
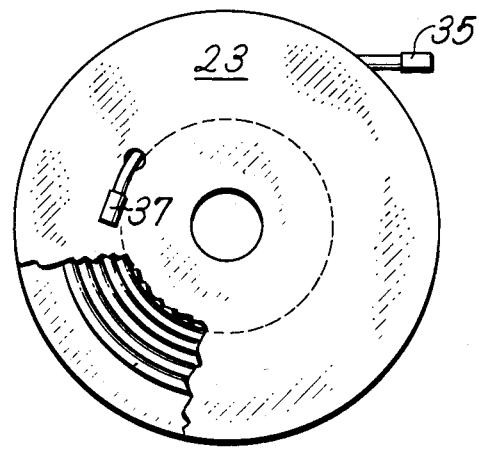
FIG. 6 shows a coil of sheathed telephone cable embodying my invention, upon a reel.

Although I have described the identifying and sealing at only one end of a cable, it will be understood that each defective pair is similarly identified at both ends. Referring to FIG. 6 the cable 11 having the end bearing the can 35 has another end bearing a can 37 that has been brought out through an opening in the flange of the reel onto which the cable has been coiled for shipment.

In order to protect the fragile insulation on the pairs 12, it is essential that the sleeve 26 shall have a smooth slippery surface and, indeed, this surface may be lubricated by petroleum jelly, if desired. I have found that a polypropylene sleeve of the dimensions I have given performs ideally. However, my invention is not limited to this material and some modifications of size may also be made in the sleeve, particularly for use with No. 19 Awg conductors or for conductors with heavier walls of insulation. Other polymeric materials may be used for the sleeve 26 if they have the desired combination of flexibility to follow the convolution of the conductor pair, stiffness to allow their urging into the cable, and surface smoothness. Suggested materials include nylon, high density polyethylene and rigid polyvinyl chloride. Although I have found a particular utility for my invention with cables having paper insulated conductors, my conception will clearly be useful for marking plastic conductors, as well.

The foregoing description has been exemplary rather than definitive of my invention for which I desire an award of Letters Patent as defined in the following claims.

I claim:

1. The method of identifying a defective pair in a sheathed telephone cable comprising a plurality of helically cabled conductor pairs and having at least one defective pair, comprising the steps of:
    A. removing a portion of the sheath from an end of said cable,
    B. providing a tubular sealing cover having a selected length closed at one end, for said cable,
    C. providing a smooth flexible sleeve for identifying said defective pair, said sleeve comprising a wall defining a notch at a selected distance along the length thereof opening into said sleeve,
    D. inserting an end of said defective pair into one end of said sleeve, withdrawing said end of said defective pair radially through said notch and leaving a portion of said sleeve free from said defective pair,
    E. while holding said end of said defective pair taut, gripping said free portion and therewith urging said sleeve into the sheathed portion of said cable along the helix of said defective pair, to a depth exceeding said length of said cover,
    F. cutting said pairs and said sleeve at a section substantially flush with a cut end of said sheath, and
    G. fitting and fastening said cover over said sheath thereby sealing said end of said cable.

2. The method of claim 1 wherein said distance is from one-half inch to six inches from one end of said sleeve, said end of said defective pair being inserted into said one end.

3. A plastic sleeve for insertion into a cable around a helically stranded telephone pair comprising a tubular wall of polymeric material, said wall defining a close fitting passageway for said pair, said sleeve being tapered at one end thereof, said wall comprising a notch defining an opening therethrough for said pair said notch sloping radially outwardly away from the tapered end of said sleeve, said sleeve being sufficiently stiff for insertion into said cable by means of a force applied to said sleeve on a portion remote from said notch and said sleeve being sufficiently flexible to follow the helix of said pair.

4. The sleeve of claim 3 wherein said polymeric material comprises a polymer selected from the group consisting of polypropylene, nylon, high density polyethylene and rigid polyvinyl chloride.

5. The sleeve of claim 4 wherein said notch is from one-half inch to about six inches from the tapered end of said sleeve.

6. The sleeve of claim 3 wherein said polymeric material comprises polypropylene.

7. The sleeve of claim 6 wherein said notch is from one-half inch to about six inches from the tapered end of said sleeve.

8. The sleeve of claim 3 wherein said notch is from one-half to about six inches from the tapered end of said sleeve.

9. A coil of sheathed telephone cable comprising a large plurality of insulated conductor pairs, of said pairs at least one being selected for marking, tubular covers sealing both ends of said cable and extending over said cable for substantial distances at said ends, polymeric sleeves having notches within said cable at both ends thereof, portions of said sleeves covering said selected pair forward of said notches and portions of said sleeves being free from said pair rearward of said notches, said sleeves extending to the ends of said cable and said portions of said sleeves covering said selected pair forward of said notches being within said cable and extending beyond the distances covered by said covers.

10. The coil of claim 9 wherein said portions of said sleeves forward of said notches are one-half inch to about six inches in length.

11. The cable of claim 10 wherein said sleeves comprise a polymeric material selected from the group consisting of polypropylene, nylon, high-density polyethylene, and rigid polyvinyl chloride.

12. The cable of claim 11 wherein said polymeric material is polypropylene.

13. The cable of claim 9 wherein said sleeves comprise a polymeric material selected from the group consisting of polypropylene, nylon, high-density polyethylene, and rigid polyvinyl chloride.

14. The cable of claim 13 wherein said polymeric material is polypropylene.

* * * * *